July 27, 1965   H. L. LIBBY   3,197,693
NONDESTRUCTIVE EDDY CURRENT SUBSURFACE TESTING DEVICE PROVIDING
COMPENSATION FOR VARIATION IN PROBE-TO-SPECIMEN
SPACING AND SURFACE IRREGULARITIES
Filed Oct. 4, 1960   4 Sheets-Sheet 1

INVENTOR.
Hugo L. Libby
BY Roland G. Anderson
Attorney

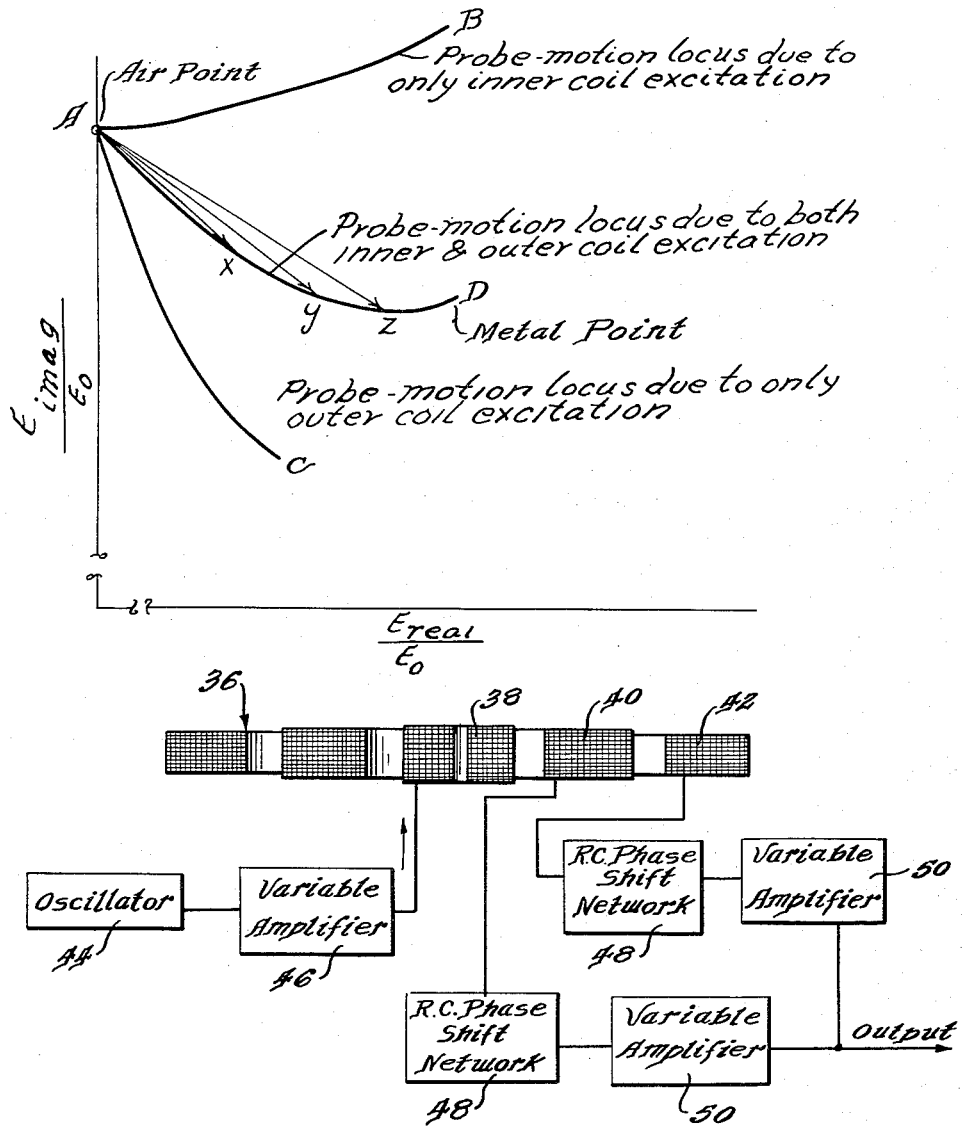

July 27, 1965 H. L. LIBBY 3,197,693
NONDESTRUCTIVE EDDY CURRENT SUBSURFACE TESTING DEVICE PROVIDING
COMPENSATION FOR VARIATION IN PROBE-TO-SPECIMEN
SPACING AND SURFACE IRREGULARITIES
Filed Oct. 4, 1960 4 Sheets-Sheet 4

INVENTOR.
Hugo L. Libby
BY Roland U Anderson
Attorney

United States Patent Office 3,197,693
Patented July 27, 1965

3,197,693
NONDESTRUCTIVE EDDY CURRENT SUBSURFACE TESTING DEVICE PROVIDING COMPENSATION FOR VARIATION IN PROBE-TO-SPECIMEN SPACING AND SURFACE IRREGULARITIES
Hugo L. Libby, Richland, Wash., assignor to the United States of America as represented by the United States Atomic Energy Commission
Filed Oct. 4, 1960, Ser. No. 60,526
10 Claims. (Cl. 324—40)

This invention relates to nondestructive testing and more specifically to devices using the electrical characteristics of a metal sample to measure subsurface irregularities therein or thickness thereof.

In the field of nondestructive testing, the eddy current method is used quite extensively to examine electrically conductive objects. In this method, eddy currents are caused to flow in the object by electromagnetic induction, and the effect of the flow of these currents on the electromagnetic field near the object is used as an indirect measure of the test object condition. Thus, by monitoring the electromagnetic field, the presence of irregularities in the structure of the test object which affect the flow of eddy currents may be detected.

A major problem in eddy current instruments is the sensitivity of the instrument to spacing between the sensing probe and the sample being tested. Variations in the air gap between the probe and the sample disturb the loading of the probe which in effect changes its inductance and resistance and results in a probe-motion signal whose phasor-locus plot is curved. Ideally the probe-motion signal locus should be straight so that subsurface irregularities may be detected independently therefrom.

Another problem in eddy current devices which are used to measure sample thickness and subsurface irregularities is the signal component due to the surface bumps on the sample. As the frequency of the signal applied to the sensing coil of the probe is lowered to increase the depth of penetration into the sample, surface bumps on the sample give a signal whose phasor-locus is in quadrature to that due to probe motion and is similar to that due to subsurface irregularities in the sample. Thus, it becomes very difficult to discriminate between subsurface irregularities and surface bumps. Such a device is a cladding thickness tester which is used to monitor the thickness of metal cladding on nuclear fuel elements. The cladding thickness tester operates at a low carrier frequency and variations in cladding thickness are indicated by changes in the demodulated output. The tester is sensitive to subsurface irregularities as desired, but it is also sensitive to surface bumps, giving bump signals on the carrier having components in quadrature with those due to changes in probe to surface spacing. Since the cladding tester uses the signal which is in quadrature to the component due to probe motion to determine thickness, it does not distinguish between bumps and changes in thickness.

It is therefore one object of this invention to provide means for the nondestructive testing of metal samples wherein the effects of probe-to-sample spacing may be controlled and/or eliminated therefrom.

It is also another object of this invention to provide means for the nondestructive testing of metal samples wherein the effects of surface bumps on the metal samples may be eliminated therefrom.

Other objects and advantages of this invention will become apparent in a further study of this specification in view of the accompanying drawings in which:

FIG. 3 is a locus plot in a complex plane of the phasor voltages as detected on the output of the inner coil of the detecting probe in the circuit of FIGURE 2.

FIG. 8 is a block diagram illustrating a further embodiment of the present invention to control the curvature of the phasor-locus due to probe motion.

Figure 1:
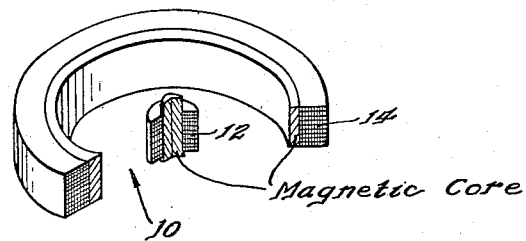
FIG. 1 is a drawing illustrating the construction of a probe used in an embodiment of the present invention.

FIGURE 1 illustrates the coil construction for a probe 10 of the present invention. The probe 10 is essentially comprised of two coils, an inner coil 12 and an outer coil 14, mounted coplanar and coaxially with respect to each other.

Figure 2:
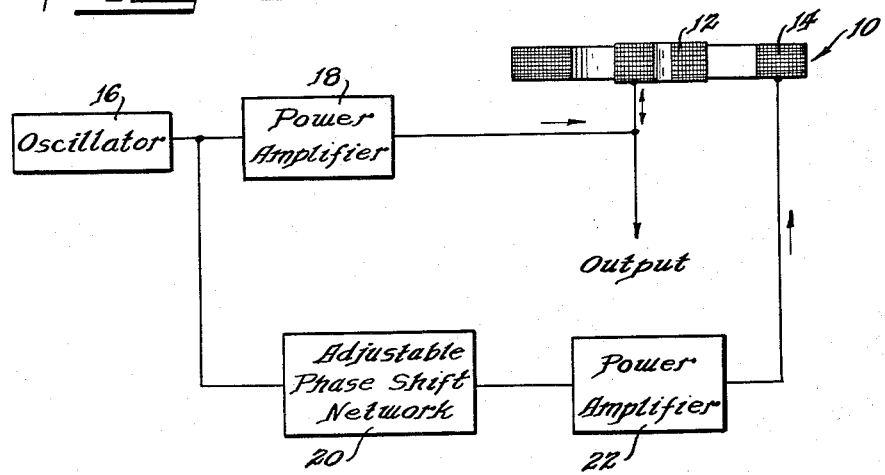
FIG. 2 is a block diagram of a basic control circuit applied to the probe of the present invention.

In FIGURE 2 a basic control circuit is shown to facilitate the explanation of the function of the probe 10 of the present invention. The oscillator 16 generates an A.-C. signal which is fed via amplifier 18 having a variable gain to the inner coil 12 of probe 10. The same A.-C. signal is fed from oscillator 16 via a variable phase shifting network 20 and a variable gain amplifier 22 to the outer coil 14 of probe 10. The output of the probe 10 is taken from the terminals of the inner coil 12. By manipulating the relative phase and amplitude contributions from the inner and outer coils 12 and 14 of the probe 10, control may be exercised over the voltage signal locus due to probe motion with respect to a metal sample. This is graphically illustrated in FIGURE 3 which is a phasor-loci plot in a complex plane of the output voltage signals of probe 10 in the circuit of FIGURE 2 as the probe spacing is varied with respect to a smooth surface metal sample having no subsurface irregularities therein. All phasor-loci in FIGURE 3 have been adjusted to have a common "air" point and all represent voltage signals as detected across the inner coil 12 of probe 10 in FIGURE 2.

Curve AB of FIGURE 3 represents the locus of signals across the inner coil 12 due only to excitation of the inner coil 12. Curve AC is the locus of output signals across the inner coil 12 due only to an excitation current of one particular phase and amplitude flowing in the outer coil 14. Curve AD represents a resultant locus when both the inner and outer coils 12 and 14 are excited. The phasors AX, AY and AZ, drawn to curve AD, are indicative of the voltages induced in the inner coil 12 from the eddy currents in the metal sample. It is readily seen from these phasors that the amplitude and phase thereof vary as the probe-to-sample spacing varies. By straightening the curve AD, the phase angles of these phasors (AX, AY and AZ) may be made constant. This locus, curve AD, may be straightened or curved in the opposite direction by adjusting the phase shift 20 and amplitude controls 18 and 22 of the circuit shown in FIGURE 2.

By adjusting the phase shift 20 and amplitude controls 18 and 22 to straighten the locus of output signals due to probe motion, a conventional phase detector which is made purposely amplitude insensitive may be applied to indicate the relative conductivity of the metal sample. The signal thus fed to the phase detector from the inner coil 12 is nulled at a point of intersection of the straight line portions of the signals due to probe motion for metals of various conductivities. The phase angle for a particular conductivity then does not vary with probe position because of the straight probe-motion locus, and the phase detector output will change only with sample conductivity which is a measure of continuity.

Figure 4:
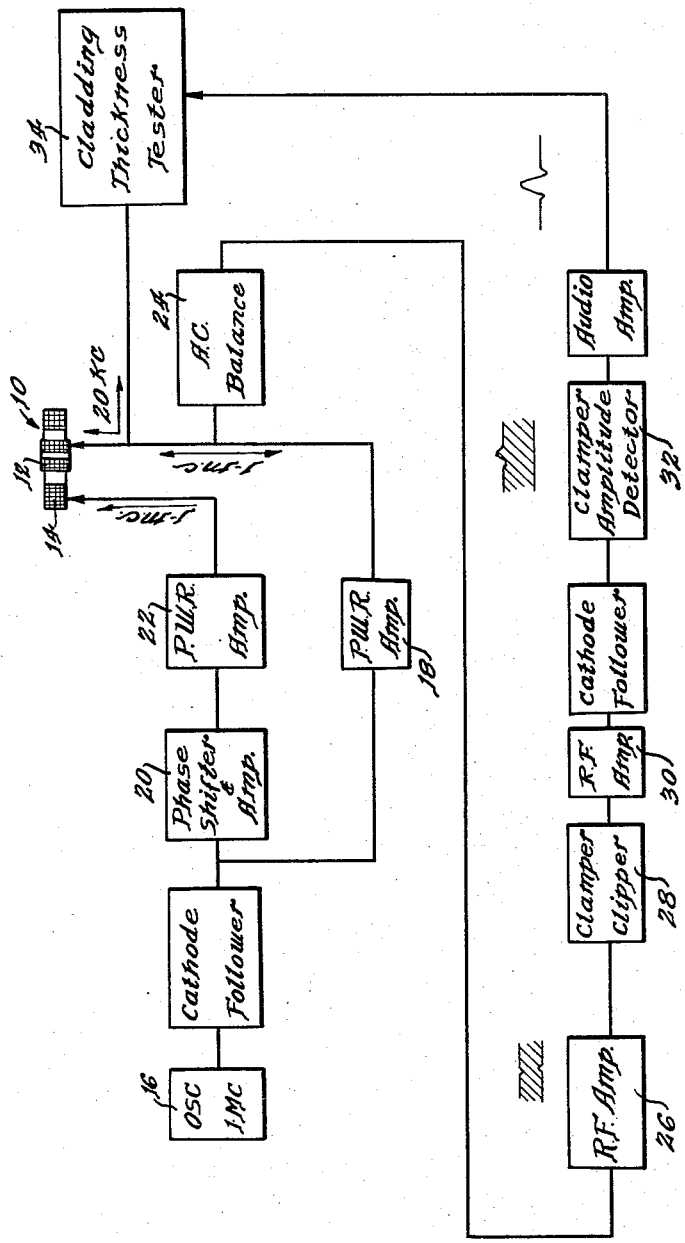
FIG. 4 is a block diagram of an embodiment of the present invention wherein control of the probe motion signal locus is used to compensate for signal components due to surface bumps on a metal sample.
Figure 5:
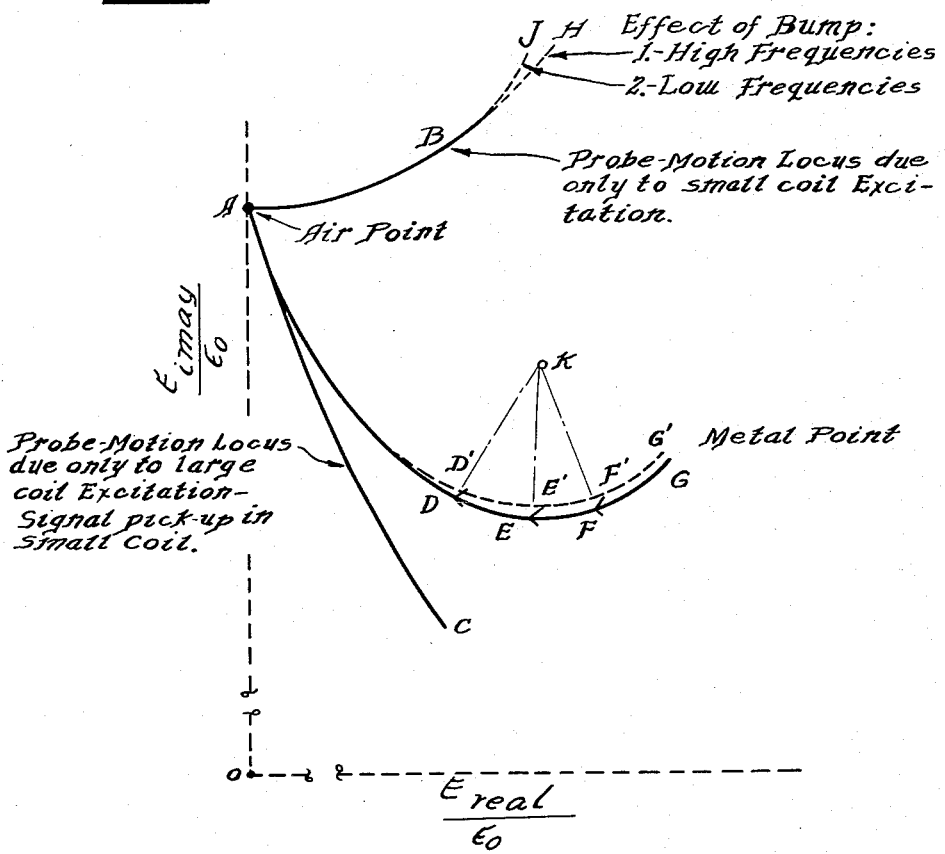
FIG. 5 is a locus plot in a complex plane of the phasor voltages as detected on the output of the inner coil of the probe in the circuit of FIGURE 4.

Further understanding of the present invention may be obtained by considering FIGURE 4 which is a block diagram of an embodiment thereof wherein the probe 10 is used to discriminate against signal components due to surface bumps on a metal sample as detected by a cladding thickness tester and FIGURE 5 which is a phasor-loci plot in a complex plane of the output voltage signals of probe 10 in FIGURE 4. For the purposes of this application, a surface bump is considered to be a mound shaped surface protrusion, roughly of circular cross section in planes parallel with the surface of the metal sample. The maximum height is about 6% of the diameter of outer coil 14 and the maximum base diameter of the bump does not exceed the diameter of the outer coil 14.

Oscillator 16 generates a 1 megacycle signal which is fed via a phase shifting network 20 and a variable gain amplifier 22 to outer coil 14 of probe 10. The same 1 megacycle signal is also fed via a variable gain amplifier 18 to the inner coil 12 of probe 10. The output of probe 10, taken from inner coil 12, is fed to an A.-C. balance circuit 24, and a second input to the balance circuit 24 is fed from the amplifier 18. The output from the A.-C. balance circuit 24 is a 1 megacycle carrier wave, amplitude modulated by bump signals and phase modulated by probe motion signals. The 1 megacycle carrier is then amplified by amplifier 26, clamped and clipped by circuit 28 to increase percentage modulation, amplified again by amplifier 30 and fed to a clamping and amplitude detecting circuit 32. The output thus obtained from the detector when a bump is scanned is a pulse of positive polarity which is then fed to the input of a cladding thickness tester 34 to compensate for bump signals detected therein. The cladding thickness tester 34 utilizes the inner coil 12 of probe 10 as a conventional eddy current probe coil and applies a 20 kilocycle signal thereto, the output signal to the cladding thickness tester 34 being taken from the inner coil 12.

The principle of operation of the circuit in FIGURE 4 is more easily understood by referring to FIGURE 5. In FIGURE 5, all phasor-loci have been adjusted to have a comon "air" point and all represent voltage signals measured across the inner coil 12 of probe 10.

As a smooth surface metal sample having no subsurface irregularities therein is brought up to the probe 10, the phasor-locus of signals detected across the inner coil 12 thereof with only excitation applied to inner coil 12 is represented by curve AB in FIGURE 5. Similarly, curve AC represents the phasor-locus of signals detected across inner coil 12 with excitation of a particular phase and amplitude applied only to outer coil 14. The effect of a bump on a metal surface on the output of a conventional eddy current probe coil, as the inner coil 12 is when operated to give curve AB, is shown at H in FIGURE 5. For an aluminum surface and a frequency of one megacycle this effect is very much like that due to probe motion, and is difficult to distinguish therefrom. However, as the frequency applied to the probe coil is lowered and the depth of eddy current penetration (skin effect depth) becomes greater, the effect of the bump differs from that due to probe motion as shown at J in FIGURE 5. The bump now gives a signal which has a component in quadrature with that due to probe motion but similar to those due to subsurface irregularities. It is this low frequency effect which causes the cladding thickness tester 34 to give signals due to surface bumps.

The amplitude and phase of the excitation current in the outer coil 14 is adjusted relative to the inner coil 12 excitation in the circuit of FIGURE 4 so that the combined effect on the detected signal at the inner coil 12 for bringing a smooth metal surface up to the probe 10 is shown in locus plot ADEFG. Thus in this case, the coils 12 and 14 cooperate to increase the curvature of the probe-motion locus. The locus AD'E'F'G' is obtained when metal of the same electrical conductivity but having a bump on the surface thereof is brought up to the probe 10.

The greater contribution of the inner coil 12, due to the metal surface of the bump being closer thereto, causes the locus AD'E'F'G' to be slightly displaced from the locus ADEFG. If a smooth surface metal sample is passed beneath the probe 10 and the spacing between the probe 10 and the metal is kept constant, a constant probe signal will be detected, say at point E. If the probe to metal spacing is decreased, then the probe signal phasor will move along the locus towards point G.

The fixed A.-C. signal fed to the input of the balance circuit 24 from amplifier 18 has an amplitude and phase such that when it is added to the signal from the inner coil 12 by the balance circuit 24 an output signal results therefrom as represented by the phasor KE, where K is the approximate center of curvature of the locus DEF. Thus, as the spacing of probe 10 with respect to the metal sample changes, the output of the balance circuit 24 is constant in amplitude but varying in phase.

Figure 7:
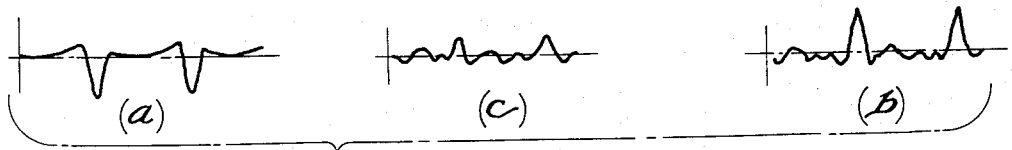
FIG. 7 illustrates signal waveforms due to bumps on a metal sample with and without compensation.

As a bump on the metal sample passes beneath the probe 10, the probe output changes to a point on locus D'E'F' as previously described depending upon the probe spacing and height and size of the bump. This causes the output from the balance circuit 24 to be decreased from KE to KE' while the bump is directly under the inner coil 12. The amplitude detector circuit 32 detects the change in amplitude and gives a pulse output for each bump passing under the probe 10. This pulse is then transmitted to the cladding thickness tester 34 where it compensates for the signal received therein due to the same bump. The signal waveforms generated by a bump are illustrated in FIGURE 7. FIGURE 7(a) shows the output of the amplitude detector 32 as seen at the trigger of the cladding thickness tester 34; note that the polarity of the pulse has been reversed. FIGURE 7(b) shows the output of the inner coil 12 due to the 20 kc. signal as seen at the trigger of the cladding thickness tester 34. FIGURE 7(c) shows the combined effect of the waveforms 7(a) and (b) as seen by the trigger of the cladding thickness tester 34 negating the effect of the signal component due to the presence of a bump on the surface of a metal sample.

Figure 6:
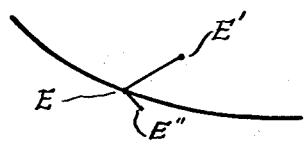
FIG. 6 is an enlarged portion of curve ADEFG in FIGURE 5 at point E.

When a bump passes under the probe 10 it must of course pass under one edge of the outer coil 14 before it can appear under the inner coil 12. The amount of electromagnetic coupling between the outer coil 14 and the bump is small as the bump effectively intercepts only a small portion of the field of the outer coil 14 as it passes thereunder. The effect of this coupling is opposite to that obtained when the bump is under the inner coil 12 and is illustrated in FIGURE 6, an enlarged portion of the curve ADEFG at point E. The probe output actually moves first to E" as the bump passed under the field of the outer coil 14 and then moves toward E' as the bump passes under the inner coil 12.

The probe 10 as hereinbefore described has, for the sake of simplicity of explanation, utilized only two annular coils, both being driven and one used as a sensing coil. It is to be understood that within the scope of the invention, probes utilizing more than two coils and different combinations of driving and sensing coils may be used to control the curvature of the probe motion locus. The basic principle of adjusting the phase and amplitude contributions of each coil to give a desired probe motion locus output remains the same. An example thereof is illustrated in FIGURE 8. The probe 36 comprises three coils 38, 40 and 42 wound coplanar and coaxially with respect to each other. Only the inner coil 38 is driven, oscillator 44 providing an A.-C. signal thereto through a variable gain amplifier 46. Coils 40 and 42 are used as sensing coils and have an R.-C. phase shifting network 48 and variable gain amplifier 50 in each of their outputs. The outputs of the amplifiers 50 of sensing coils 40 and 42 are connected to algebraically add and give a single output for the probe 36. The theory of operation to control the phasor-locus of signals due to probe motion is basically similar to that for probe 10 as hereinbefore described, the relative phase and amplitude contributions of each of the coils 40 and 42 being adjusted to give the desired probe motion locus.

Persons skilled in the art will, of course, readily adapt the teachings of the invention to embodiments far different than the embodiments illustrated. Accordingly, the scope of the protection afforded the invention should not be limited to the particular embodiments thereof shown in the drawings and described above, but shall be determined only in accordance with the appended claims.

What is claimed is:

1. A metal discontinuity measuring device comprising a probe having an annular driver coil; a plurality of annular sensing coils mounted coaxially and coplanar with said driver coil and having their outputs connected to give a single resultant output; means for applying a variable amplitude A.-C. signal to said driver coil; means for varying the amplitude and phase of the outputs of each of said sensing coils such that probe-to-metal motion does not vary the phase of the single resultant output signal, whereby the phase of the single resultant output signal of said sensing coils is a measure of discontinuities within said metal; and means for measuring such phase of the single resultant output signal as an indication of such discontinuities.

2. A metal discontinuity measuring device comprising a probe having an annular driver coil and first and second sensing coils mounted coaxially and coplanar with said driver coil, the outputs of each of said sensing coils being connected to give a single resultant output; means for applying a variable amplitude A.-C. signal to said driver coil; a first R.-C. phase shifting network and variable gain amplifier in series connection with the output of said first sensing coil, a second R.-C. phase shifting network and variable gain amplifier in series connection with the output of said second sensing coil; said first and second R.-C. phase shifting networks and variable gain amplifiers coacting such that probe-to-metal motion does not vary the phase of the single resultant output signal, whereby the phase of the single resultant output signal of said sensing coils is a measure of discontinuities within said metal; and means for measuring such phase as an indication of such discontinuities.

3. A device for measuring discontinuity in a metal sample comprising a probe having two annular coils mounted coaxially and coplanar with respect to each other; means for applying a variable amplitude A.-C. signal to one of said coils; means for applying an equal-frequency amplitude-and-phase variable A.-C. signal to the other coil; said A.-C. signals being applied to said coils simultaneously; and means for measuring the resultant signal across one of said coils, the measured resultant signal being a measure of discontinuities within said metal.

4. A device for measuring discontinuity in a metal sample comprising a probe having a first annular coil and a second annular coil of smaller diameter mounted coaxially and coplanar with said first coil; means for applying an amplitude-variable A.-C. signal to said second coil; means for applying an equal-frequency phase-and-amplitude variable A.-C. signal to said first coil; said A.-C. signals being applied to said coils simultaneously; and means for measuring the resultant signal across said second coil, the measured resultant signal being a measure of discontinuities within said metal.

5. The device of claim 4 wherein the relative phases and amplitudes of said A.-C. signals are such that probe-to-metal motion does not vary the phase of the resultant signal across said second coil whereby the phase angle of the resultant signal across said second coil is a measure of discontinuities within said metal.

6. The device of claim 5 wherein said measuring means comprise a phase amplitude detector responsive only to discontinuities in the metal whose phasor loci are in approximate quadrature to the locus of signals due to probe to metal motion.

7. A device for measuring discontinuity in a metal sample comprising a probe having first and second annular coils mounted coaxially and coplanar with respect to each other; means for applying an amplitude-variable high frequency A.-C. signal to said second coil; means for applying an equal high frequency phase-and-amplitude variable A.-C. signal to said first coil; means for applying a low frequency A.-C. signal to said second coil; said A.-C. signals being applied to said coils simultaneously; means for detecting changes in amplitude and phase of said low frequency A.-C. signal responsive to discontinuities in said metal; and means responsive to the resultant high frequency signal on said second coil for compensating said detecting means for effects induced by bumps occurring on the surface of said metal.

8. A device for measuring discontinuity in a metal sample comprising a probe having a first annular coil and a second annular coil of smaller diameter mounted coaxially and coplanar within said first coil; means for applying an amplitude-variable high frequency A.-C. signal to said second coil; means for applying an equal high frequency phase-and-amplitude variable A.-C. signal to said first coil; means for applying a low frequency A.-C. signal to said second coil; said A.-C. signals being applied to said coils simultaneously; means for detecting changes in amplitude and phase of said low frequency A.-C. signal responsive to discontinuities in said metal; and means responsive to the resultant high frequency signal on said second coil for compensating said detecting means for effects induced by bumps occurring on the surface of said metal.

9. The device according to claim 8 wherein said compensating means comprise means to add the output voltage of said second coil to a reference voltage having an amplitude and phase such that the output of said adding means is a modulated A.-C. signal responsive in amplitude to metal surface changes and in phase to probe motion; detecting means responsive only to amplitude changes in said modulated A.-C. signal; and means to subtract the output of said detecting means from the output of said low-frequency detecting means such that the effects induced by bumps occurring on the surface of said metal are compensated therefor.

10. A metal electrical conductivity measuring device comprising a probe having an annular driver coil; a plurality of annular sensing coils mounted coaxially and coplanar with said driver coil; means for applying an A.-C. signal to said driver coil; means for varying the amplitude and phase of the outputs of each of said sensing coils; means for combining the said outputs of said sensing coils such that probe-to-metal motion does not vary the phase of the resultant signal, whereby the phase of the resultant signal is a measure of the metal electrical conductivity.

References Cited by the Examiner
UNITED STATES PATENTS

| | | | |
|---|---|---|---|
| 2,111,210 | 3/38 | Ebel | 324—40 |
| 2,555,853 | 6/51 | Irwin | 324—34 |
| 2,957,129 | 10/60 | Irwin | 324—40 X |

WALTER L. CARLSON, *Primary Examiner.*

SAMUEL BERNSTEIN, *Examiner.*